United States Patent [19]

Moineau

[11] Patent Number: 4,921,209

[45] Date of Patent: May 1, 1990

[54] WATER CONTROL VALVE

[75] Inventor: Hubert J. Moineau, Bolton, Mass.

[73] Assignee: Automatic Specialties, Inc., Marlboro, Mass.

[21] Appl. No.: 354,348

[22] Filed: May 19, 1989

Related U.S. Application Data

[62] Division of Ser. No. 207,738, Jun. 16, 1988, Pat. No. 4,867,189.

[51] Int. Cl.[5] .................... F16K 31/122

[52] U.S. Cl. .................... 251/30.01; 251/31; 137/624.11

[58] Field of Search .................... 251/31, 129.19, 30.01, 251/30.05; 137/625.64, 624.14, 624.11

[56] References Cited

U.S. PATENT DOCUMENTS

| | | | |
|---|---|---|---|
| 2,708,452 | 5/1955 | Tappan | 251/31 X |
| 3,385,166 | 5/1968 | Kroffke | 137/624.14 X |
| 4,230,155 | 10/1980 | Frye | 137/624.22 |
| 4,298,181 | 11/1981 | Corrado | 137/625.64 X |
| 4,412,671 | 11/1983 | Tiefenthaler | 251/31 |
| 4,712,767 | 12/1987 | Losser | 251/129.19 X |

*Primary Examiner*—Alan Cohan

*Attorney, Agent, or Firm*—Richard P. Crowley

[57] ABSTRACT

The length of time a bather can use a shower is controlled by a pair of timers and a solenoid operated valve. A first timer controls the length of time water flows through the shower by energizing and de-energizing solenoids. Another timer prevents the solenoids from being energized for a predetermined time period after the first timer has turned the water off. This prevents the shower from being turned on again until the time period has elasped.

9 Claims, 3 Drawing Sheets

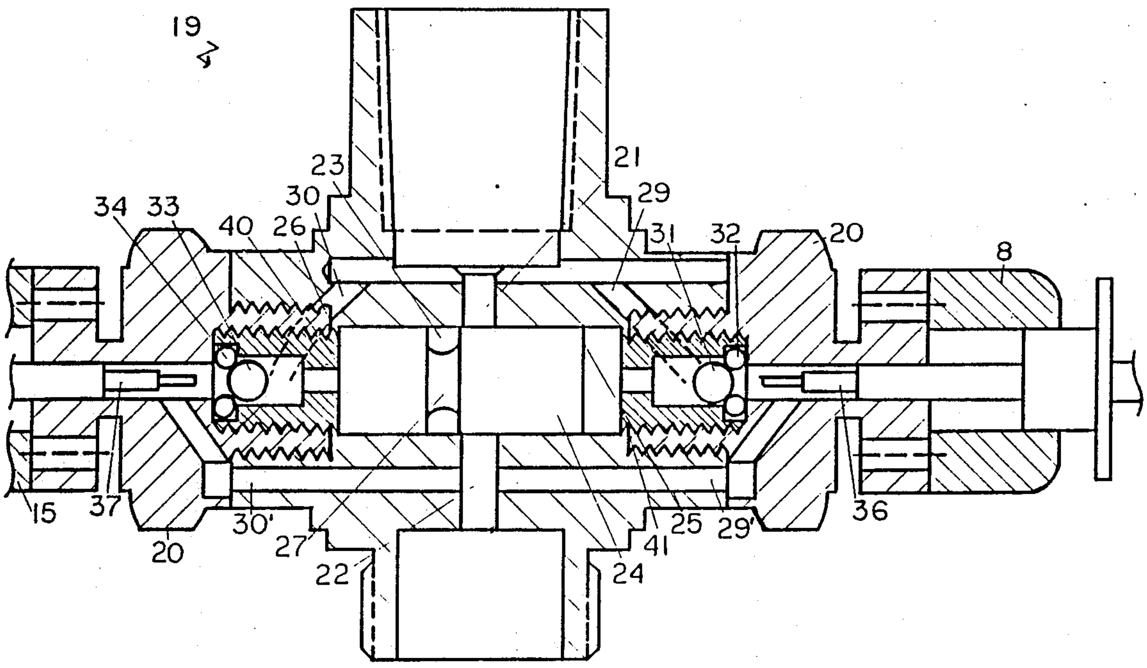
F/G. 2
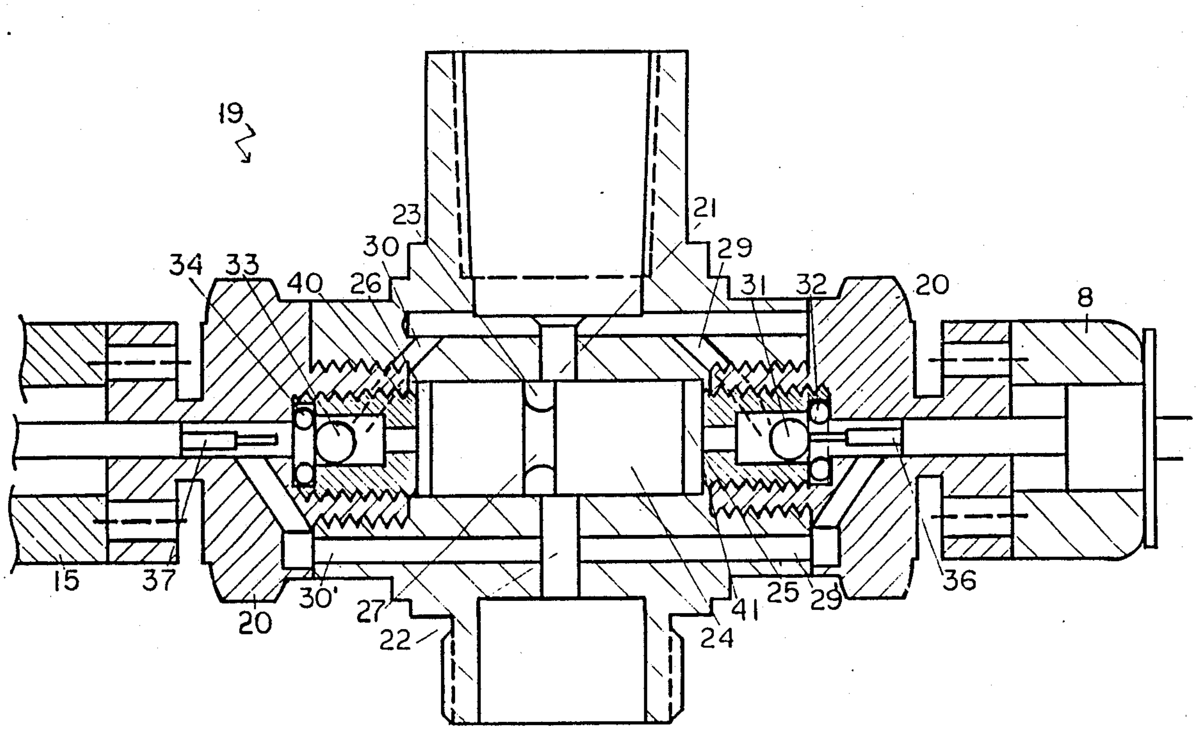
F/G. 3

WATER CONTROL VALVE

This is a divisional of co-pending application Ser. No. 07/207,738 filed on June 16, 1988 now U.S. Pat. No. 4,867,189 issued Sept. 19, 1989.

BACKGROUND OF THE INVENTION

This invention relates to the control of water flow, and more particularly to controlling the time during which water can be used for bathing. Running water through a shower for an excessive time wastes both water and the fuel needed to heat the water. This can occur when someone spends too much time bathing, or when a shower is left running after the bather has departed. Prior attempts to control the time spent bathing with timers have been deficient in that they could be defeated simply by re-starting a timer as soon as it had shut off the water.

OBJECTIVES OF THE INVENTION

Accordingly, it is an object of this invention to provide improved means and methods for controlling the flow of water.

Another object is to provide efficient solenoid activated valves.

Another object is to provide a system that conserves water and the energy needed to heat the water.

Another object is to control the time period during which a valve permits water for bathing to pass through a shower head.

Another object is to provide a flow control system that shuts off water flow after a predetermined time period and does not allow the water flow to be resumed until after another time period has elapsed.

Another object is to turn off a shower after it has been used for long enough to clean the bather, and thus to prevent the bather from turning the shower on again for a long enough time to discourage an attempt for a second or a longer shower.

Another object is to turn off the flow of bathing water after a first period of time and to keep the water turned off for a second period of time, with neither period of time being controllable by bathers.

Another object is to provide a battery operated liquid flow control valve that employs a pair of solenoids.

Another object is to provide an efficient hot water control system.

Another object is to provide a low voltage shower control system that uses a timer to prevent frustration of the objectives of the control system, that is durable, relatively economical, easy to repair and maintain, and which does not possess defects found in similar prior art systems.

Other objects and advantages of the invention will be revealed in the specifications and claims, and the scope of the invention will be set forth in the claims.

DESCRIPTION OF THE DRAWING

FIG. 2 is a cross sectional view of a valve in accord with this invention showing the valve closed.

FIG. 3 is a cross sectional view of the embodiment of FIG. 2 showing the valve partially opened.

DESCRIPTION OF THE INVENTION

Figure 1:
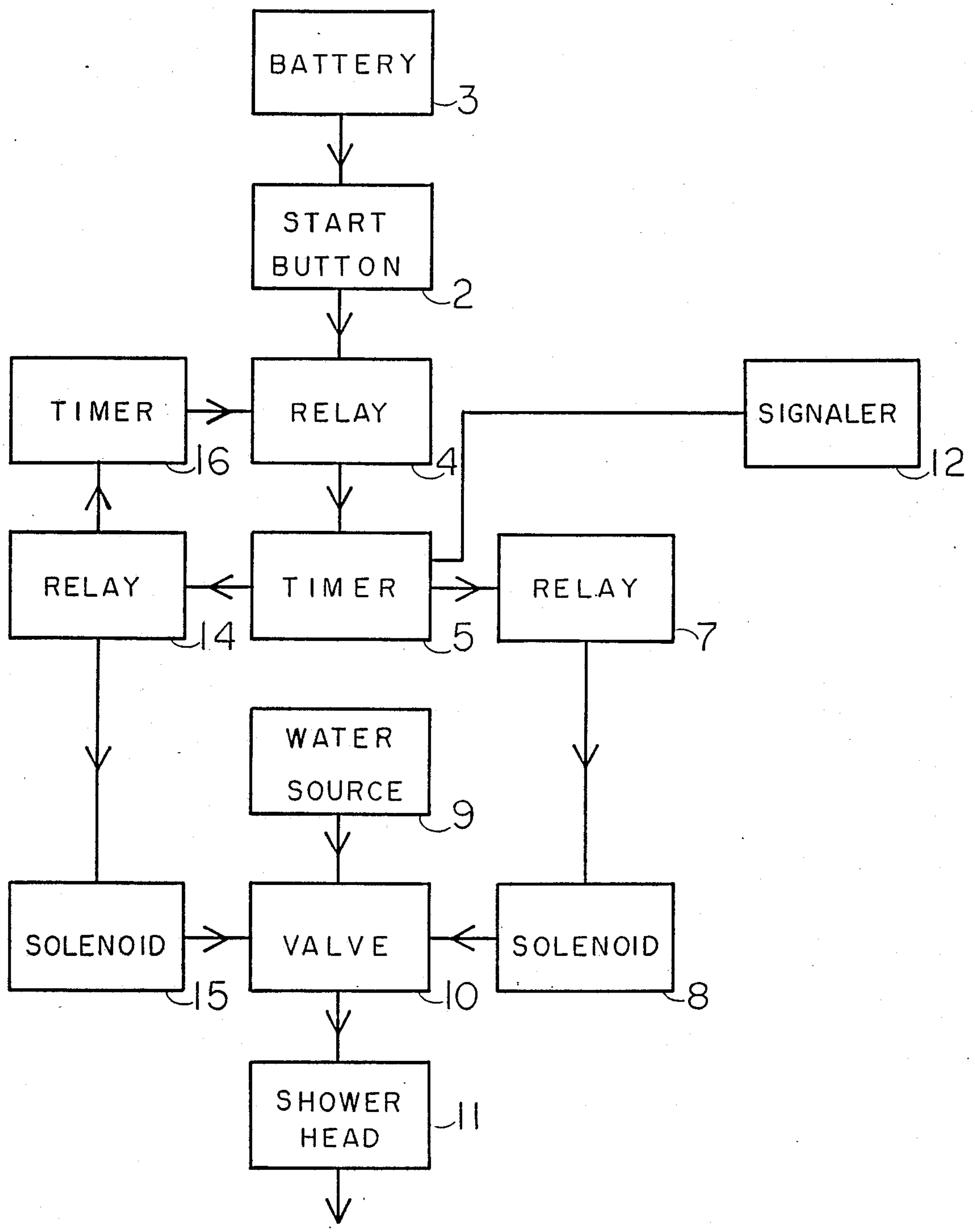
FIG. 1 is a schematic representation of a water flow control system in accord with this invention.

The drawing shows a water flow control system 1 that limits the use of a shower to a predetermined first period of time, after which the shower is automatically turned off, and that prevents the shower from being turned on again until after a second predetermined period of time has elapsed. A person taking a shower activates the system and starts the shower by pushing a button 2 that is located conveniently to the shower. This connects low voltage dry cell battery means 3 to normally closed first relay means 4 and activates first timer means 5 which closes and then opens normally open second relay means 7. The closing and opening of relay means 7 energizes and then de-energizes first solenoid 8, which permits water to flow from a pressurized source 9 of heated water through flow control valve means 10 in a manner described hereafter; the water then flows through shower head 11 to the person taking a bath. After a predetermined first time period, timer means 5 activates signal producing means 12; this sounds a buzzer or a bell and alerts the person taking a shower that the water will be turned off in a short time (e.g. one minute). After such short time has elapsed, timer means 5 closes and then opens normally open third relay means 14 and starts second timer means 16. The closing and opening of relay means 14 energizes and then de-energizes second solenoid 15, which stops water from flowing from source 9 through control valve means 10, in a manner described hereafter. As flow is stopped through valve means 10, second timer means 16 opens normally closed relay means 4 and keeps relay means 4 open for a predetermined second time period. With relay means 4 open, first timer means 5 and relay means 7 are disconnected from battery means 3, so the shower cannot be turned on again by pushing button 2. After the second time period has passed, timer means 16 lets relay means 4 close again, which permits the shower to be turned on again by a bather pushing button 2. Except for valve means 10 as described below, all components of system 1 are conventional, so they have not been described in detail.

One embodiment of a solenoid activated valve 19 usable as the valve means 10 in flow control system 1 is shown in FIGS. 2–5. Valve 19 has a valve body 20 with an inlet 21 connected to pressurized water source 9 and an outlet 22 connected to shower head 11. Inlet 21 and outlet 22 are essentially the same size and are aligned along a transverse axis of body 20 through the center of the body. A flow control chamber 23 connects the water inlet 25 and water outlet 32, and a flow control piston 24 having a first end 25 and a second opposite end 26 is slidable in chamber 23. Piston 24 has an off-center conduit 27 for selectively connecting inlet 21 to outlet 22 and for blocking flow between the inlet and outlet. A first passage 29 provided in valve body 20 connects inlet 21 to first end 25 of the piston and a second passage 30 provided in valve body 20 connects inlet 21 to second end 26 of the piston. Flow through first passage 29 is controlled by a first ball check valve 31 which seats against a first O-ring 32, and flow through second passage 30 is controlled by a second ball check valve 33 which seats against a second O-ring 34.

When valve 19 is used, system 1 operates as follows. FIG. 2 shows the off position of valve 19 with no water flowing from inlet 21 to outlet 22. Flow cannot occur because the pressure through passages 29 and 30 on opposite ends 25 and 26 of a valve piston 24 is equal, both ball check valves 31 and 33 are seated against their respective O-ring seals, and second end of piston 24 rests against a shoulder 40 that defines one end of chamber 23, and this causes conduit 27 through piston 24 to be out of alignment with inlet 21 and outlet 22.

Figure 4:
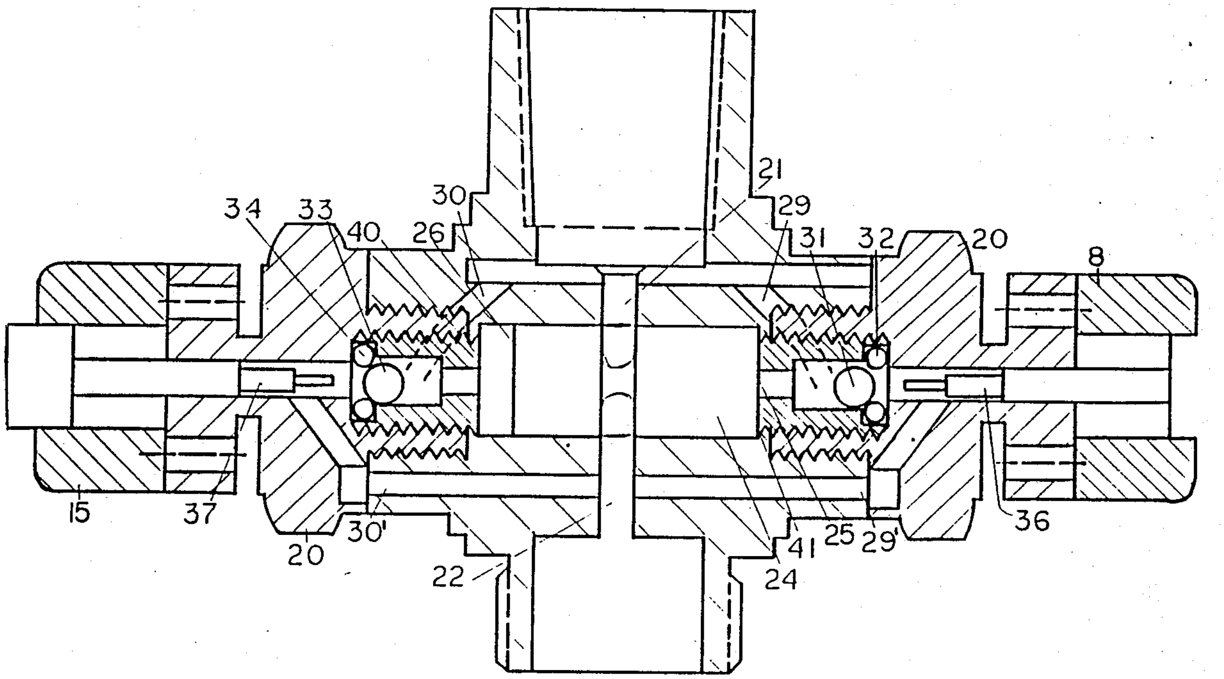
FIG. 4 is a cross sectional view of the embodiment of FIG. 2 showing the valve fully opened.
Figure 5:
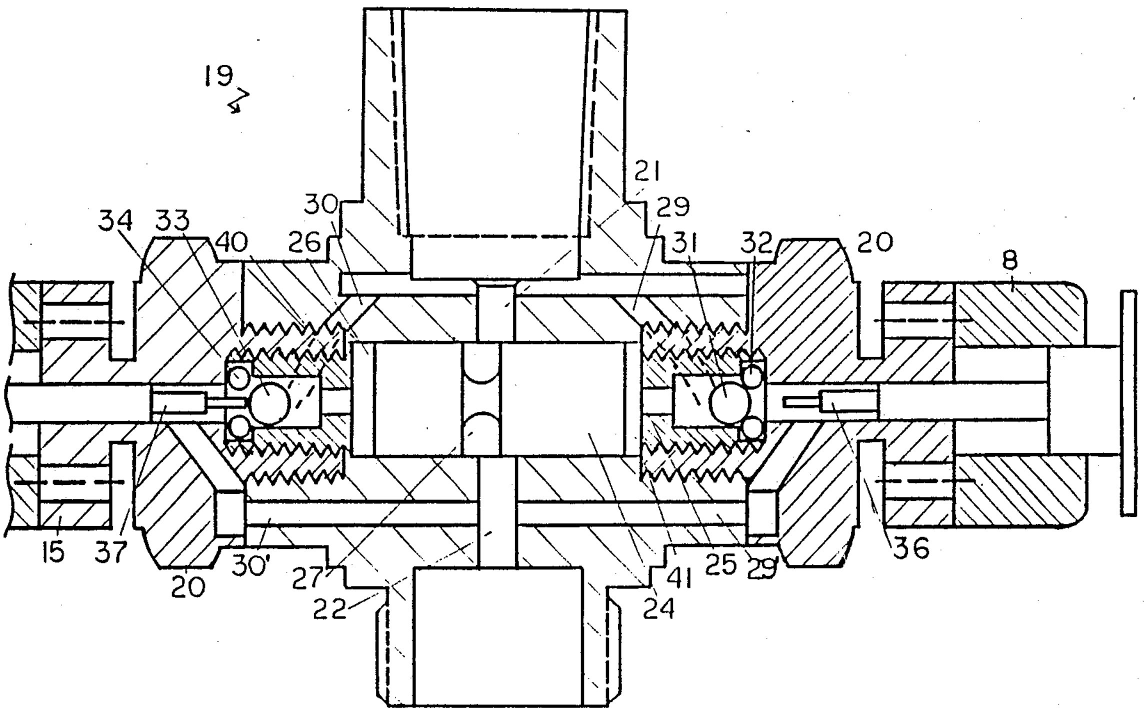
FIG. 5 is a cross sectional view of the embodiment of FIG. 2 showing the valve partially closed.

To begin a shower, the bather pushes button 2 which connects timer 5 to battery 3 through relay 4. Timer 5 closes relay 7 and this lets current flow from battery 3 to solenoid 8. Momentary energization of solenoid 8 causes its rod 36 to move along the central axis of valve body 20 until rod 36 contacts ball valve 31 and moves the ball off O-ring seal 32. The unseating of valve 31 opens first passage 29 and connects inlet 21 to outlet 22 through passage 29 and 29'. Since outlet 22 is essentially at the pressure of shower head 11, the pressure on the first end 25 of piston 24 is reduced and the piston moves out of contact with shoulder 40 toward a shoulder 41 at the other end of chamber 32. This moves conduit 27 into partial alignment with inlet 21 and outlet 22, as shown in FIG. 3. Piston 24 moves into contact with shoulder 41 and timer 5 opens relay 7, which turns off solenoid 8 causing the water pressure in passage 29 to force ball check valve 31 to seal against O-ring 32 and rod 36 to retract back through O-ring 32. As shown in FIG. 4 water is now flowing from inlet 21 through conduit 27 to outlet 22, and from there through shower head 11 to the bather for the duration of the first predetermined time period. With both check valves 31 and 33 seated, the pressure is equal on the opposite ends 25 and 26 of piston 24. A short time before the first timer period ends, timer 5 activates signaling means 12 to provide an audible warning to the bather and soon thereafter timer 5 closes relay 14. This lets current to flow from battery 3 to solenoid 15. Energization of solenoid 15 causes its rod 37 to move along the central axis of valve body 20 until rod 37 contacts ball valve 33 and moves the valve off O-ring seal 34. The unseating of valve 33 opens second passage 30 and connects inlet 21 to outlet 22 through passage 30 and 30'. This reduces the pressure on the second end 26 of piston 24 and causes the piston to move toward shoulder 40 as shown in FIG. 5. After piston 24 has moved into contact with shoulder 40, timer 5 opens relay 14 which turns off solenoid 15 causing the water pressure in passage 30 to force ball check valve 33 to seal against O-ring 34 and rod 37 to retract back out of O-ring 34. The parts of valve 19 now have the positions shown in FIG. 2 and the shower has been turned off. Timer 5 activates timer 16 which opens relay 4 and prevents the energization of solenoid 8 for a second period of time, as explained above, so that the shower cannot be turned on again until the second period has expired.

The invention also includes methods for automatically controlling water flow through shower head 11. The water flowing to the shower head is confined in that all of the water must pass through valve means 10, which opens to permit water flow and closes to prevent water flow. Controlling the time during which a bather can shower is accomplished by timing of the flow of water through shower head 11 with timer means 5 and automatically closing valve means 10 after a predetermined first time period has elapsed. Timer means 16 is used for automatically preventing resumption of water flow by deactivating valve means 10 in its closed position until after a predetermined second time period has elapsed.

It has thus been shown that by the practice of this invention, water flow control system 1 places the time that a shower can be used out of the control of a bather. This conserves water and the energy needed to heat it. The system cannot be defeated because second timer 1 prevents restarting the shower until after a predetermined time has elapsed. The control components may be locked up or placed out of the reach of bathers, so a bather cannot change the first and second time periods. The use of a pair of solenoids aligned along the central axes of valve 19 and valve 42 simplifies the operation of the valves and reduces the current drain on battery means 3.

While the invention has been described with reference to particular embodiments, it is not intended to illustrate or describe herein all of the equivalent forms or ramifications thereof. Also, the words used are words of description rather than limitation, and various changes may be made without departing from the spirit or scope of the invention disclosed herein. For example, signaller 12 may provide a visual signal instead of or in addition to an audible signal. It is intended that the appended claims cover all such changes as fall within the true spirit and scope of the invention.

What is claimed is:

1. A valve for controlling the flow of water which valve comprises:

(a) a valve body having a central longitudinal axis and a water inlet adapted to be connected to a pressurized water source, and a water outlet adapted to be connected to a shower head, the said water inlet and outlet aligned along a transverse axis of the valve body and a flow control chamber along the longitudinal axis of the valve body and connecting the said water inlet and water outlet;

(b) a water control piston slidable in said flow control chamber, said piston having first and second opposite ends, and having an off center conduit for selectively connecting the said water inlet and water outlet;

(c) the valve body having a first passage connecting the said water inlet and the first end of the said piston;

(d) the valve body having a second passage connecting the said water outlet and the second end of said piston;

(e) a first check valve means in said first passage to prevent water from flowing out of said first passage;

(f) a second check valve means in said second passage to prevent water from flowing out of said second passage; and (g) first solenoid means and second solenoid means at opposite ends of the said flow chamber, the first solenoid means on energizing opening said first check valve means to cause water to flow from said water inlet to said water outlet through the off center conduit of the said piston, and the second solenoid means on energizing opening said second check valve means to prevent the flow of water from the said water inlet to the said water outlet, thereby controlling the flow of water through the valve.

2. The invention defined in claim 1 wherein said first and second passages each connect said water inlet to said water outlet, and said first and second check valve means each prevent water from flowing from said water inlet to said water outlet.

3. The invention defined in claim 1 wherein said first and second check valve means are ball valves.

4. The invention defined in claim 3 wherein said first and second solenoid means each have a rod projecting therefrom and energization of said solenoid means causes said rod to move into contact with said ball valve as as to unseat said ball valve.

5. The invention defined in claim 4 wherein said rods are coaxially aligned.

6. The invention defined in claim 1 wherein the first and second solenoid means are positioned at opposite ends of and coaxially with the longitudinal axis of the valve body.

7. The invention as defined in claim 1 which includes a source of pressurized water and means to connect the said source to the water inlet.

8. The invention as defined in claim 7 which includes a water shower head and means to connect the water shower head to said water outlet.

9. The invention as defined in claim 7 which includes means to energize the first and second solenoid means.

* * * * *